United States Patent
Messick et al.

(10) Patent No.: US 11,226,665 B2
(45) Date of Patent: Jan. 18, 2022

(54) SYSTEMS AND METHODS FOR OPTIMIZING FAULT TOLERANT REDUNDANCY FOR AN INFORMATION HANDLING SYSTEM WITH MULTIPLE POWER SUPPLY UNITS

(71) Applicant: Dell Products L.P., Round Rock, TX (US)

(72) Inventors: Doug E. Messick, Austin, TX (US); Craig A. Klein, Elgin, TX (US); Aaron M. Rhinehart, Georgetown, TX (US); Kyle E. Cross, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 16/543,187

(22) Filed: Aug. 16, 2019

(65) Prior Publication Data

US 2021/0048867 A1 Feb. 18, 2021

(51) Int. Cl.
*G06F 1/30* (2006.01)
*G06F 9/4401* (2018.01)
*G06F 1/3206* (2019.01)
*G06F 11/20* (2006.01)

(52) U.S. Cl.
CPC .............. *G06F 1/30* (2013.01); *G06F 1/3206* (2013.01); *G06F 9/4401* (2013.01); *G06F 11/2015* (2013.01)

(58) Field of Classification Search
CPC ........ G06F 1/30; G06F 1/3206; G06F 9/4401; G06F 11/2015
See application file for complete search history.

(56) References Cited

U.S. PATENT DOCUMENTS

| | | | |
|---|---|---|---|
| 6,504,266 B1* | 1/2003 | Ervin | H02J 1/10 307/29 |
| 7,512,824 B2* | 3/2009 | Artman | G06F 1/32 713/340 |
| 2002/0066045 A1* | 5/2002 | Layton | G06F 1/28 713/300 |
| 2005/0283624 A1* | 12/2005 | Kumar | G06F 1/3203 713/300 |
| 2007/0067656 A1* | 3/2007 | Ranganathan | G06F 1/3203 713/320 |
| 2009/0077407 A1* | 3/2009 | Akimoto | G06F 1/26 713/340 |
| 2009/0307512 A1* | 12/2009 | Munjal | G06F 1/30 713/324 |

(Continued)

*Primary Examiner* — Gary Collins
(74) *Attorney, Agent, or Firm* — Jackson Walker L.L.P.

(57) ABSTRACT

A system may include a plurality of power supply units and a management device communicatively coupled to the plurality of power supply units and configured to determine a minimum number of power supplies required to support a maximum peak power budget for components of the system, determine a minimum number of power supplies required to support a minimum peak power budget for components of the system, and reduce a throttle threshold of a number of healthy power supplies of the system at which a fast throttling of the components of the system will occur if the minimum number of power supplies required to support the maximum peak power budget is equal to the minimum number of power supplies required to support the minimum peak power budget.

15 Claims, 2 Drawing Sheets

(56) References Cited

U.S. PATENT DOCUMENTS

| | | | | |
|---|---|---|---|---|
| 2012/0079299 A1* | 3/2012 | Cepulis | ............... | G06F 1/3206 713/320 |
| 2015/0370301 A1* | 12/2015 | Bolan | ...................... | G06F 1/30 713/322 |

* cited by examiner

SYSTEMS AND METHODS FOR OPTIMIZING FAULT TOLERANT REDUNDANCY FOR AN INFORMATION HANDLING SYSTEM WITH MULTIPLE POWER SUPPLY UNITS

TECHNICAL FIELD

The present disclosure relates in general to information handling systems, and more particularly to methods and systems for optimizing fault redundancy for an information handling system with multiple power supply units.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include power budgeting features to protect data stored in volatile media, power supplies, and to implement fail-safe behaviors. One type of budgeting is fault tolerant redundant (FTR) budgeting, in which budgeting of power is performed to allow an information handling system to tolerate a failure of a power supply unit in an array of power supply units. However, traditional FTR budgeting was designed for information handling systems having two power supply units, and is thus not optimized for systems with a greater number of power supplies.

For example, using existing approaches, a power budget policy may be implemented to support peak power needs of an information handling system with redundant power supply units. In response to a power supply unit failure, FTR features may throttle power consumption by the information handling system to prevent peak power excursions until the peak power control system is updated with new values reflecting the failed power supply unit. In some instances, such throttling may occur when not needed (e.g., when the capacity of the remaining supplies was capable of handling peak power needs of the information handling system). Such unneeded throttling may result in a negative user experience.

In addition, existing approaches do not differentiate between grid redundancy and power supply unit redundancy, such that any loss of a "power OK" signal from a PSU may create a throttled condition, even when not necessary.

SUMMARY

In accordance with the teachings of the present disclosure, the disadvantages and problems associated with existing approaches to managing power in an information handling system may be reduced or eliminated.

In accordance with embodiments of the present disclosure, a method may include, in a system comprising a plurality of power supply units, determining a minimum number of power supplies required to support a maximum peak power budget for components of the system, determining a minimum number of power supplies required to support a minimum peak power budget for components of the system, and reducing a throttle threshold of a number of healthy power supplies of the system at which a fast throttling of the components of the system will occur if the minimum number of power supplies required to support the maximum peak power budget is equal to the minimum number of power supplies required to support the minimum peak power budget.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in a system comprising a plurality of power supply units: determine a minimum number of power supplies required to support a maximum peak power budget for components of the system; determine a minimum number of power supplies required to support a minimum peak power budget for components of the system; and reduce a throttle threshold of a number of healthy power supplies of the system at which a fast throttling of the components of the system will occur if the minimum number of power supplies required to support the maximum peak power budget is equal to the minimum number of power supplies required to support the minimum peak power budget.

In accordance with these and other embodiments of the present disclosure, a system may include a plurality of power supply units and a management device communicatively coupled to the plurality of power supply units and configured to determine a minimum number of power supplies required to support a maximum peak power budget for components of the system, determine a minimum number of power supplies required to support a minimum peak power budget for components of the system, and reduce a throttle threshold of a number of healthy power supplies of the system at which a fast throttling of the components of the system will occur if the minimum number of power supplies required to support the maximum peak power budget is equal to the minimum number of power supplies required to support the minimum peak power budget.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
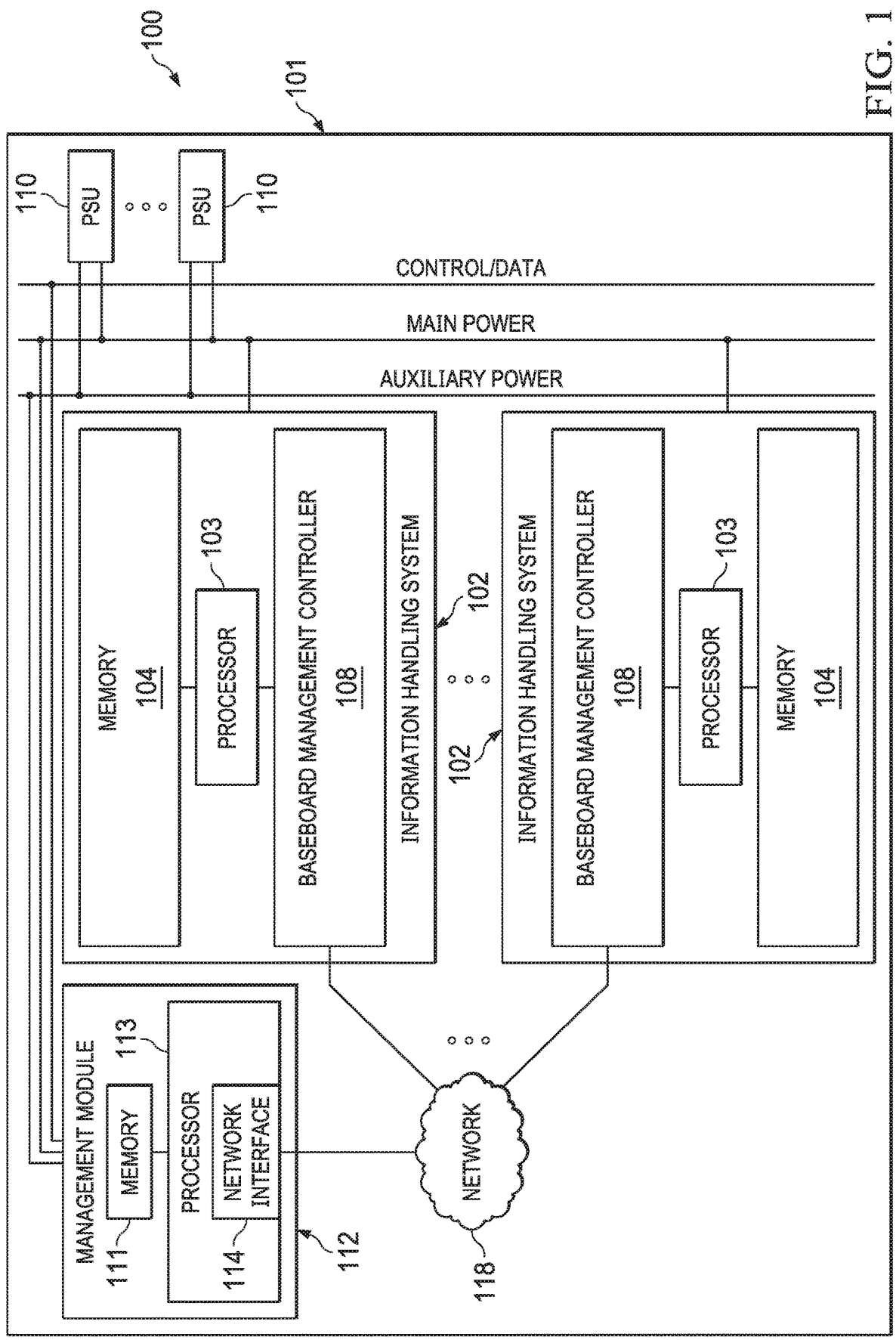
FIG. 1 illustrates a block diagram of an example system, in accordance with embodiments of the present disclosure.
Figure 2:
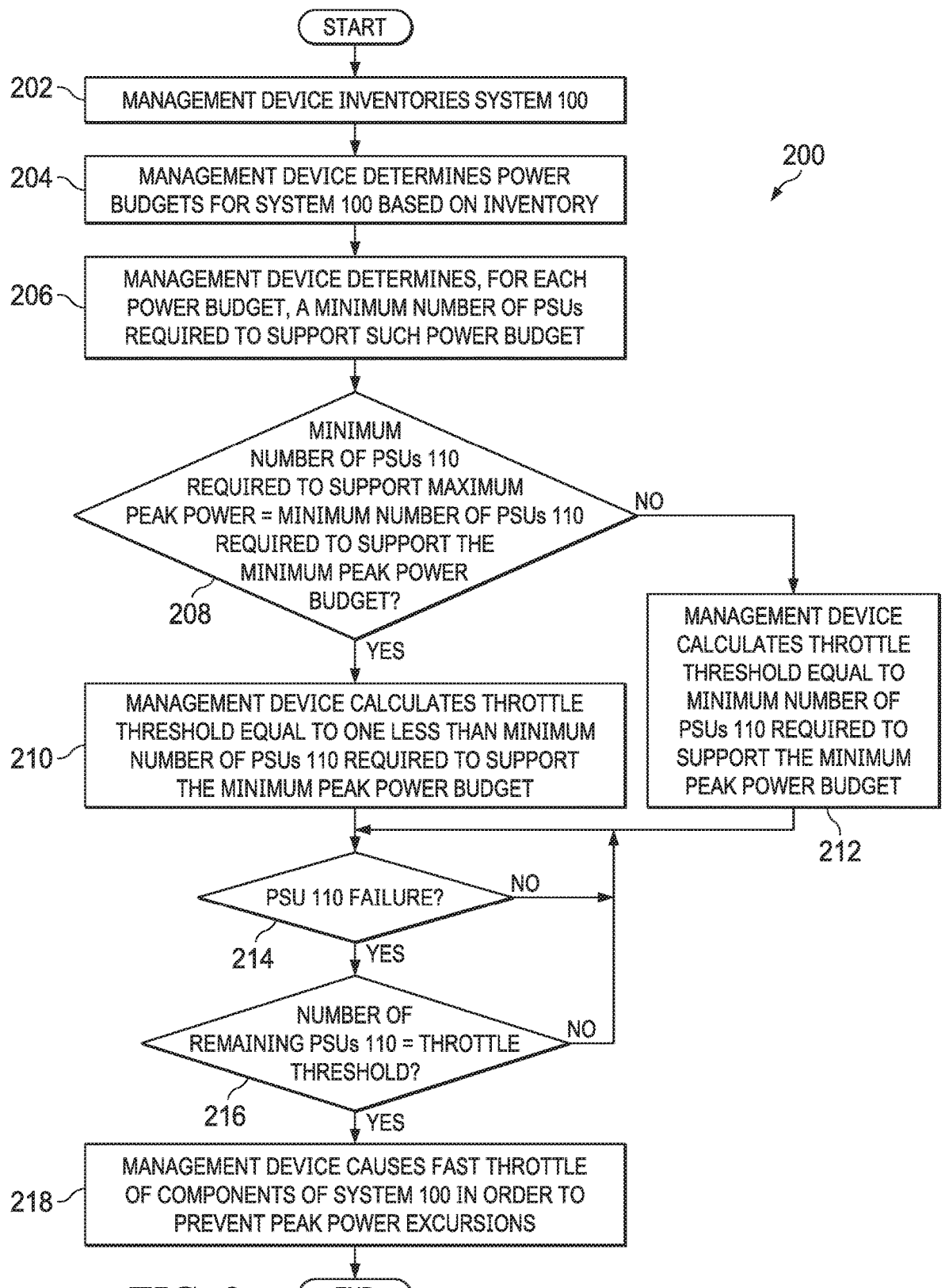
FIG. 2 illustrates a flow chart of an example method for optimizing fault tolerant redundancy for an information handling system having multiple power supplies, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100, in accordance with embodiments of the present disclosure. As shown in FIG. 1, system 100 may comprise a chassis 101 for enclosing a plurality of information handling resources, including a plurality of modular information handling systems 102 (e.g., sleds), a management module 112, an internal network 118, and a power system comprising one or more power supply units (PSUs) 110.

Chassis 101 may include any suitable enclosure for housing the various components of system 100, and may also be referred to as a rack, tower, enclosure, and/or housing.

As shown in FIG. 1, an information handling system 102 may include a processor 103, a memory 104 communicatively coupled to processor 103, and a baseboard management controller 108 communicatively coupled to processor 103.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in an associated memory 104 and/or another component of its associated information handling system 102.

A memory 104 may be communicatively coupled to an associated processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

A baseboard management controller 108 may be configured to provide out-of-band management facilities for management of information handling system 102. Such management may be made by baseboard management controller 108 even if information handling system 102 is powered off or powered to a standby state. In certain embodiments, baseboard management controller 108 may include or may be an integral part of a remote access controller (e.g., a Dell Remote Access Controller or Integrated Dell Remote Access Controller).

Although, for the purposes of clarity and exposition, FIG. 1 depicts only two information handling systems 102 within system 100, it is understood that system 100 may comprise any suitable number of information handling systems 102.

In addition to a processor 103, a memory 104, and a baseboard management controller 108, an information handling system 102 may include one or more other information handling resources. For example, in some embodiments, an information handling system 102 may include more than one memory 104. As another example, in some embodiments, an information handling system 102 may include a programmable logic device (e.g., integral to or separate from baseboard management controller 108).

Management module 112 may be configured to provide out-of-band management facilities for management of shared chassis infrastructure of system 100, such as air movers, PSUs 110, and/or other components shared by a plurality of information handling systems 102. Such management may be made by management module 112 even if system 100 is powered off or powered to a standby state. Management module 112 may include a processor 113 and one or more memories 111. In certain embodiments, management module 112 may include or may be an integral part of an enclosure controller (EC). In other embodiments, management module 112 may include or may be an integral part of a chassis management controller (CMC). Although, for the purposes of clarity and exposition, FIG. 1 depicts only one management module 112, it is understood that system 100 may comprise any suitable number of management modules 112. For example, in some embodiments, two management modules 112 may be arranged in a redundant configuration, in which, at a given moment, one management module 112 may be "active" in that it is actively functional and performing its functionality, while another management module 112 is in a "standby" mode and may become active in the event that the active management module 112 experiences a fault or failure that causes it to failover to the standby management module 112.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions (e.g., firmware) and/or process data stored in memory 111 and/or another component of system 100 or management module 112. In some embodiments, processor 113 may comprise an enclosure controller configured to execute firmware relating to functionality as an enclosure controller. As shown in FIG. 1, processor 113 may include a network interface 114 for communicating with an internal network 118 of system 100.

Memory 111 may be communicatively coupled to processor 113 and may include any system, device, or apparatus configured to retain program instructions and/or data for a period of time (e.g., computer-readable media). Memory 111 may include RAM, EEPROM, a PCMCIA card, flash memory, magnetic storage, opto-magnetic storage, or any suitable selection and/or array of volatile or non-volatile memory that retains data after power to management module 112 is turned off.

Internal network 118 may comprise any suitable system, apparatus, or device operable to serve as communication infrastructure for network interfaces 114 to communicate to one or more other components, such as baseboard management controllers 108 of information handling systems 102.

Generally speaking, a PSU 110 may include any system, device, or apparatus configured to supply electrical current to one or more information handling resources of system 100. As shown in FIG. 1, a PSU 110 may provide electrical energy via (a) a main power rail, indicated in FIG. 1 as "MAIN POWER," and (b) an auxiliary power rail, indicated in FIG. 1 as "AUX POWER." The main power rail may generally be used to provide power to information handling resources of an information handling system 102 when such information handling system 102 is turned on and/or to provide power to certain components of system 100. On the other hand, the auxiliary power rail may generally be used to provide power to certain auxiliary information handling resources when energy is not supplied via the main power rail. For example, the auxiliary power rail may be used to provide power to baseboard management controller 108 when electrical energy is not provided to processor 103, memory 104, and/or other information handling resources via the main power rail. As another example, the auxiliary power rail may be used to provide power to management module 112 when electrical energy is not provided to information handling resources 102 via the main power rail.

In some embodiments, a management module 112 may be configured to communicate with one or more PSUs 110 to communicate control and/or telemetry data between management module 112 and PSUs 110. For example, a PSU 110 may communicate information regarding specifications (e.g., power rating, maximum current, etc.) and/or measurements of electrical parameters (e.g., electrical currents or voltages) present within such PSU 110.

In addition to information handling systems 102, management modules 112, internal network 118, and PSUs 110, system 100 may include one or more other information handling resources. As another example, in some embodiments, an information handling system 102 may include a programmable logic device (e.g., integral to or separate from management module 112).

In operation, as described in greater detail below, in a modular system including multiple information handling systems 102, management module 112 may perform power management functions based on an inventory of the components within chassis 101 (e.g., in particular, the power requirements of such components) including a minimum number of PSUs 110 required to provide a maximum peak power budgeted for system 100, a minimum number of PSUs 110 required to provide a minimum peak power budget required in a fault condition of PSUs 110 (e.g., fault tolerant redundancy), and a minimum number of PSUs 110 required to provide a minimum power needed to support minimum operation of components within chassis 101. In addition, also as described in greater detail below, management module 112 may, based on the minimum number of PSUs 110 required to provide a maximum peak power budgeted for system 100 and the minimum number of PSUs 110 required to provide a minimum peak power required in a fault condition of PSUs, determine a threshold of healthy PSUs 110 at which management module 112 may cause fast throttling (e.g., "hammer throttling") of components of system 100 in order to prevent peak power excursions due to a failure of a PSU 110.

In a monolithic system (e.g., including a single information handling system 102 and no management controllers 112), such power management functionality described above may be performed by a baseboard management controller 108. In both modular and monolithic systems, such power management functionality may be performed by a programmable logic device integral to or independent from management module 112 or baseboard management controller 108.

FIG. 2 illustrates a flow chart of an example method 200 for optimizing fault tolerant redundancy for an information handling system 102 having multiple power supplies, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, after powering on and/or rebooting of a management device (e.g., management module 112, baseboard management controller 108, programmable logic device integral to or independent from a management module 112 or baseboard management controller 108), the management device may inventory system 100. At step 204, based on such inventory, the management device may determine power budgets for system 100, including without limitation a maximum peak power budget for providing peak power needs of system 100, a minimum peak power budget required in fault condition of PSUs 110, and a minimum power budget needed to support minimum operation of components of system 100.

At step 206, based on the power budgets and power capacities of PSUs 110, the management device may determine, for each power budget, a minimum number of PSUs required to support such power budget. Thus, the management device may determine: (a) a minimum number of PSUs 110 required to support the maximum peak power budget, (b) a minimum number of PSUs 110 required to support the minimum peak power budget, and (c) a minimum number of PSUs 110 required to support the minimum power budget.

At step 208, the management device may compare the minimum number of PSUs 110 required to support the maximum peak power budget to the minimum number of PSUs 110 required to support the minimum peak power budget. If both numbers are the same, method 200 may proceed to step 210. If the numbers are different, method 200 may proceed to step 212.

At step 210, responsive to the minimum number of PSUs 110 required to support the maximum peak power budget being equal to the minimum number of PSUs 110 required to support the minimum peak power budget, the management device may calculate a throttle threshold of healthy PSUs 110 at which management module 112 may cause fast throttling (e.g., "hammer throttling") of components of system 100 in order to prevent peak power excursions due to a failure of a PSU 110, such threshold equal to one less than the minimum number of PSUs 110 required to support the minimum peak power budget. After completion of step 210, method 200 may proceed to step 214.

At step 212, responsive to the minimum number of PSUs 110 required to support the maximum peak power budget being different than (e.g., more than) the minimum number of PSUs 110 required to support the minimum peak power budget, the management device may calculate the throttle threshold of healthy PSUs 110 to be equal to the minimum number of PSUs 110 required to support the minimum peak power budget. After completion of step 212, method 200 may proceed to step 214.

At step 214, the management device may monitor for a failure of a PSU 110. If failure of a PSU 110 occurs, method 200 may proceed to step 216. Otherwise, method 200 may remain at step 214 until a failure of a PSU 110 occurs.

At step 216, in response to failure of a PSU 110, the management device may determine if the number of remaining PSUs 110 is equal to the throttle threshold of healthy PSUs 110. If the number of remaining PSUs 110 is equal to the throttle threshold of healthy PSUs 110, method 200 may proceed to 218. Otherwise, if the number of remaining PSUs 110 is not equal (e.g., more than) to the throttle threshold of healthy PSUs 110, method 200 may proceed again to step 214.

At step 218, responsive to the number of remaining PSUs 110 being equal to the throttle threshold of healthy PSUs 110, the management device may cause a fast throttle of components of system 100 in order to prevent peak power excursions. After completion of step 218, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a baseboard management controller 108, and/or any other system operable to implement method 200. In certain embodiments, method 200 may be implemented partially or fully in software and/or firmware embodied in computer-readable media.

To further illustrate operation of a management device and method 200, reference is made to the table below, which shows for each of two different systems 100, a minimum number of PSUs 110 required to support the maximum peak power budget, a minimum number of PSUs 110 required to support the minimum peak power budget, and the minimum number of PSUs 110 required to support the minimum power budget, as determined in step 206 of method 200. The table also shows the result of the calculation of the throttle threshold of healthy PSUs 110, as determined at steps 208, 210, and 212 of method 200.

|  | System A | System B |
| --- | --- | --- |
| Maximum Peak | 5 | 3 |
| Minimum Peak | 4 | 3 |
| Minimum | 2 | 2 |
| Throttle Threshold | 4 | 2 |

As shown in the table above, for system A, the minimum number of PSUs 110 required to support the maximum peak power budget is different than (e.g., more than) the minimum number of PSUs 110 required to support the minimum peak power budget, and thus a management device may calculate the throttle threshold as being equal to the minimum number of PSUs 110 required to support the minimum peak power budget. On the other hand, for system B, the minimum number of PSUs 110 required to support the maximum peak power budget is equal to the minimum number of PSUs 110 required to support the minimum peak power budget, and thus the management device may calculate the throttle threshold as being equal to one less the minimum number of PSUs 110 required to support the minimum peak power budget.

In other words, in system B, because it is known that the number of PSUs 110 required to support the minimum peak power budget is sufficient to support the maximum peak power budget, it follows that a failure of a PSU 110 resulting in a number of healthy PSUs 110 necessary to support the minimum peak power budget will be sufficient to support the maximum peak power budget, and fast throttling is not needed to prevent peak power excursions.

Another advantage to the approach described above is that the management device may be able to distinguish between grid redundancy and PSU redundancy by implementing a variable (e.g., the throttle threshold of PSUs 110) indicating a minimum number of PSUs 110 required to support a desired power budget policy.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising, in a system comprising a plurality of power supply units:
    determining a minimum number of power supplies required to support a maximum peak power budget for components of the system;
    determining a minimum number of power supplies required to support a minimum peak power budget for components of the system; and
    reducing a throttle threshold of a number of healthy power supplies of the system at which a fast throttling of the components of the system will occur if the minimum number of power supplies required to support the maximum peak power budget is equal to the minimum number of power supplies required to support the minimum peak power budget.

2. The method of claim 1, further comprising:
    setting the throttle threshold equal to the minimum number of power supplies required to support the minimum peak power budget if the minimum number of power supplies required to support the maximum peak power budget is more than the minimum number of power supplies required to support the minimum peak power budget; and
    setting the throttle threshold equal to one less than the minimum number of power supplies required to support the minimum peak power budget if the minimum number of power supplies required to support the maximum peak power budget is equal to the minimum number of power supplies required to support the minimum peak power budget.

3. The method of claim 1, further comprising:
    determining the maximum peak power budget for components of the system based on an inventory of the components of the system; and
    determining the minimum peak power budget for components of the system based on the inventory.

4. The method of claim 3, further comprising inventorying the components of the system to generate the inventory.

5. An article of manufacture comprising:
    a non-transitory computer-readable medium; and
    computer-executable instructions carried on the computer-readable medium, the instructions readable by a processor, the instructions, when read and executed, for causing the processor to, in a system comprising a plurality of power supply units:
        determine a minimum number of power supplies required to support a maximum peak power budget for components of the system;
        determine a minimum number of power supplies required to support a minimum peak power budget for components of the system; and
        reduce a throttle threshold of a number of healthy power supplies of the system at which a fast throttling of the components of the system will occur if the minimum number of power supplies required to support the maximum peak power budget is equal to the minimum number of power supplies required to support the minimum peak power budget.

6. The article of claim 5, the instructions for further causing the processor to:
    set the throttle threshold equal to the minimum number of power supplies required to support the minimum peak power budget if the minimum number of power supplies required to support the maximum peak power budget is more than the minimum number of power supplies required to support the minimum peak power budget; and
    set the throttle threshold equal to one less than the minimum number of power supplies required to support the minimum peak power budget if the minimum number of power supplies required to support the maximum peak power budget is equal to the minimum number of power supplies required to support the minimum peak power budget.

7. The article of claim 5, the instructions for further causing the processor to:

determine the maximum peak power budget for components of the system based on an inventory of the components of the system; and determine the minimum peak power budget for components of the system based on the inventory.

8. The article of claim 7, the instructions for further causing the processor to inventory the components of the system to generate the inventory.

9. A system comprising:

a plurality of power supply units; and a management device communicatively coupled to the plurality of power supply units and configured to:

determine a minimum number of power supplies required to support a maximum peak power budget for components of the system;

determine a minimum number of power supplies required to support a minimum peak power budget for components of the system; and reduce a throttle threshold of a number of healthy power supplies of the system at which a fast throttling of the components of the system will occur if the minimum number of power supplies required to support the maximum peak power budget is equal to the minimum number of power supplies required to support the minimum peak power budget.

10. The system of claim 9, the management device further configured to:

set the throttle threshold equal to the minimum number of power supplies required to support the minimum peak power budget if the minimum number of power supplies required to support the maximum peak power budget is more than the minimum number of power supplies required to support the minimum peak power budget; and set the throttle threshold equal to one less than the minimum number of power supplies required to support the minimum peak power budget if the minimum number of power supplies required to support the maximum peak power budget is equal to the minimum number of power supplies required to support the minimum peak power budget.

11. The system of claim 9, the management device further configured to:

determine the maximum peak power budget for components of the system based on an inventory of the components of the system; and determine the minimum peak power budget for components of the system based on the inventory.

12. The system of claim 11, the management device further configured to inventory the components of the system to generate the inventory.

13. The system of claim 9, wherein the management device comprises a chassis-level management controller.

14. The system of claim 9, wherein the management device comprises an information handling system-level baseboard management controller.

15. The system of claim 9, wherein the management device comprises a programmable logic device.

* * * * *